United States Patent [19]
Evans

[11] 4,061,842
[45] Dec. 6, 1977

[54] FAIL SAFE BATTERY

[75] Inventor: David G. Evans, Hackettstown, N.J.

[73] Assignee: The United States of America as represented by the Secretary of the Army, Washington, D.C.

[21] Appl. No.: 744,901

[22] Filed: Nov. 26, 1976

[51] Int. Cl.² .............................................. H01M 6/38
[52] U.S. Cl. ...................................... 429/116; 429/118
[58] Field of Search ............... 429/118, 116, 115, 113, 429/110

[56] References Cited

U.S. PATENT DOCUMENTS

| 2,992,289 | 7/1961 | Meyers | 429/116 |
| 3,139,356 | 6/1964 | Shigeo Tsuji | 429/115 |
| 3,222,225 | 12/1965 | Amiet et al. | 429/115 |
| 3,343,994 | 9/1967 | Stanimirovitch | 429/116 X |
| 3,846,117 | 11/1974 | Mauch et al. | 429/116 X |

Primary Examiner—Anthony Skapars
Attorney, Agent, or Firm—Nathan Edelberg; A. Victor Erkkila; Costa Perchem

[57] ABSTRACT

This invention relates to a delay action battery, containing an electrolyte sealed and retained externally to the battery case in order to prevent premature activation due to exposure to excessive heat and or crush forces.

1 Claim, 4 Drawing Figures

FAIL SAFE BATTERY

GOVERNMENTAL INTEREST

The invention described herein may be manufactured, used and licensed by or for the Government for Governmental purposes without the payment to me of any royalty thereon.

BACKGROUND OF THE INVENTION

This invention relates to a deferred-action battery that is activated by the introduction of electrolyte into the area occupied by the cell plates at a predetermined time.

Increased emphasis on the safety of weapons systems which may be exposed to abnormal environments, such as fire, and crash forces, has resulted in the need for a new type battery that would be immune to premature activation. Such batteries have become objects of increasing interest as a power source of electrical energy, in fact they are indispensable to a modern arsenal.

A serious difficulty of prior deferred-action batteries has resided in their premature activation on exposure to high temperatures and varied types of external pressures. In addition, such batteries often malfunction due to internal deterioration or damage to the ampoule containing the electrolyte. Another deficiency of former devices is their vulnerability to activation from the heat generated by mechanical stresses resulting from a crash environment.

SUMMARY OF THE INVENTION

Increased emphasis on the safety of weapons systems which may be exposed to abnormal environments, such as fire and the forces culminating from a crash, has resulted in the need for a new type of primary safing device.

A principal object of this invention is to develop a battery which is activated only when subjected to an electrical signal.

Another object is to provide a battery that is totally immune to activation when subjected to heat or crush forces.

A further object is to insure a battery with a long shelf life, under adverse conditions without deterioration.

A still further object is to achieve uniform distribution of the electrolyte to all of the cell plates in the battery.

It is still another object to insure that the electrical circuit remains unenergized until the projectile is launched.

Other objects and advantages of the invention will be apparent from the following description taken in connection with the accompanying drawings which form a part thereof.

It has now been found that the foregoing objectives can be obtained by a novel and unique deferred-action battery as hereafter described.

The invention relates to a battery, particularly a zinc-silver oxide battery, that will not be vulnerable to activation from an environment generating heat or from mechanical stresses. More specifically, the battery contains an electrolyte reservoir out of contact with the electrolyte until the use of the battery is required. When it is desired to activate the battery the electrolyte is permitted to enter the battery and immerse the cell plates. This retentive feature of the battery which postpones activation makes possible the use of a weapon system when it is needed. In addition, activation of the battery is achieved rapidly, completely, safely and reliably with total immunity to premature or unwanted activation.

The subject invention fulfills the needs of the art, as described above, by providing a deferred-action battery especially adapted for use in munitions.

BRIEF DESCRIPTION OF THE DRAWINGS

One embodiment of such battery assembly is shown in the accompanying drawings in which.

DETAILED DESCRIPTION OF THE INVENTION

Figure 1:
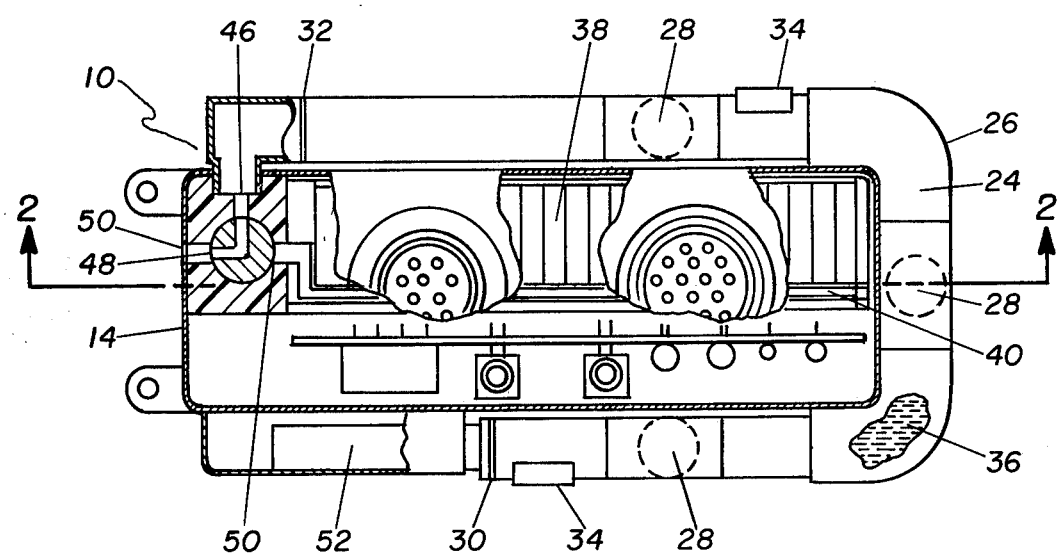
FIG. 1 is a top view of the battery showing the external electrolyte reservoir configuration.
Figure 2:
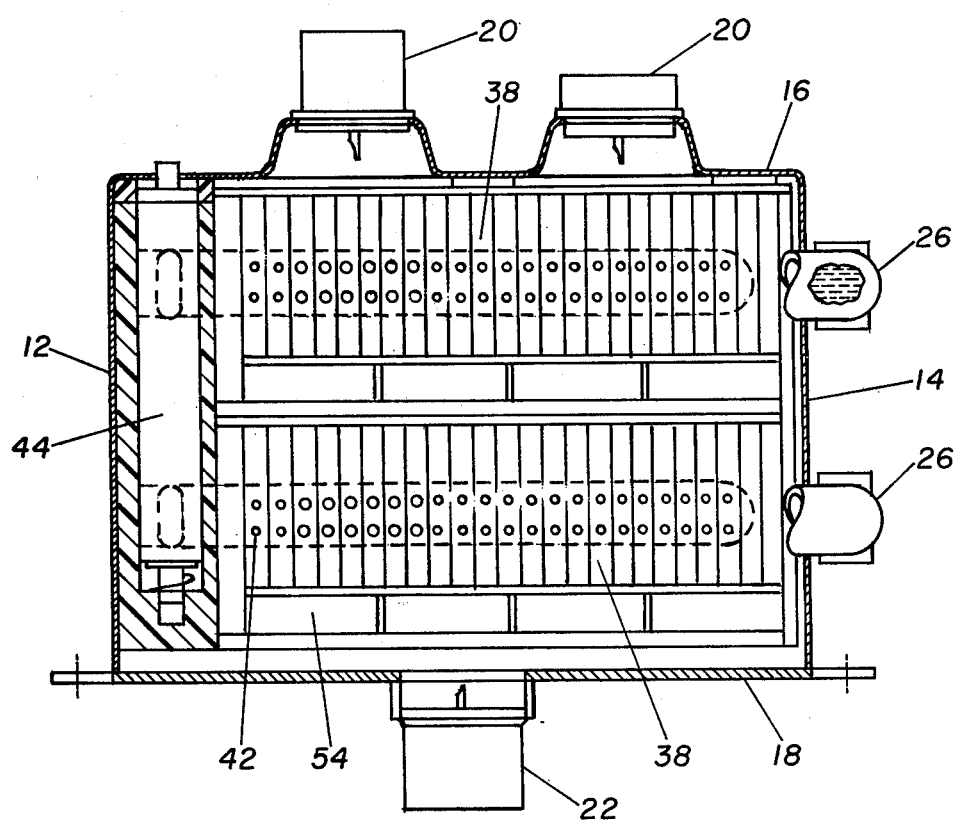
FIG. 2 is a sectional partial cutaway view of the battery taken along AA as shown in FIG. 1.

As shown in FIG. 1, the battery 10 comprises a casing 12 made of a suitable structural material, having side walls 14 and top 16 and bottom 18 covers and electrical terminals consisting of an input connector 20 and an output connector 22 which protrudes through the casing 12 and are insulated from both the top 16 and bottom 18 covers. The electrolyte reservoir 24 consists of a closed tubing 26 which is provided with blow-out plugs 28 and diaphragms 30 and 32 and is secured to the side walls of the casing 12 by means of clamps 34. The tubing 26 is constructed of a material, such as copper, that is compatible with the corrosive electrolyte 36 contained therein and capable of maintaining its structural integrity when subjected to the forces to be experienced when placed in use. When the device is not in use the electrolyte 36 is retained in the reservoir tubing 26 and thereby isolated from the battery cells 38 by diaphragm 32. Within casing 12 are mounted a plurality of cells 38 which contain anode and cathode cell plates 38 (e.g. zinc and silver oxide) and which are connected to an electrolyte manifold 40 via opening 42.

Figure 3:
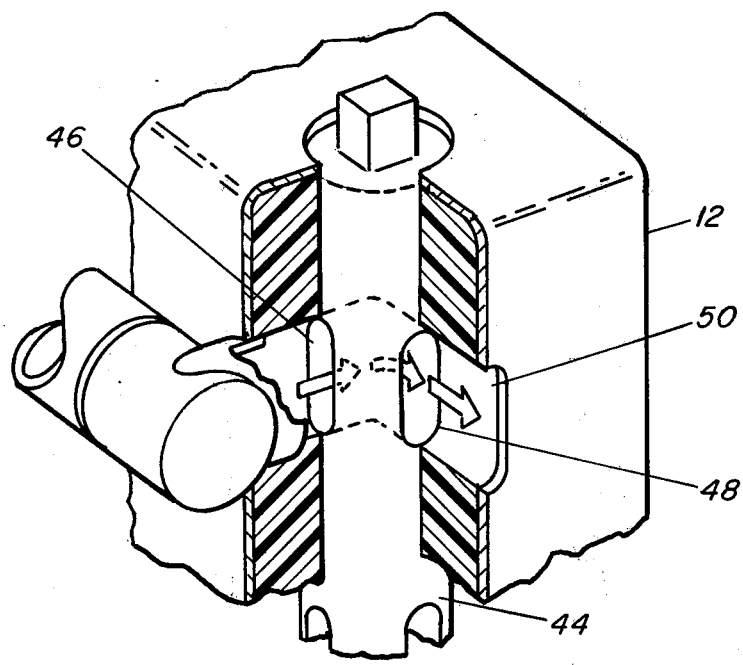
FIG. 3 is an enlarged sectional view of the arming device as shown in FIGS. 1 and 2, where the electrolyte is flowing out of the battery.
Figure 4:
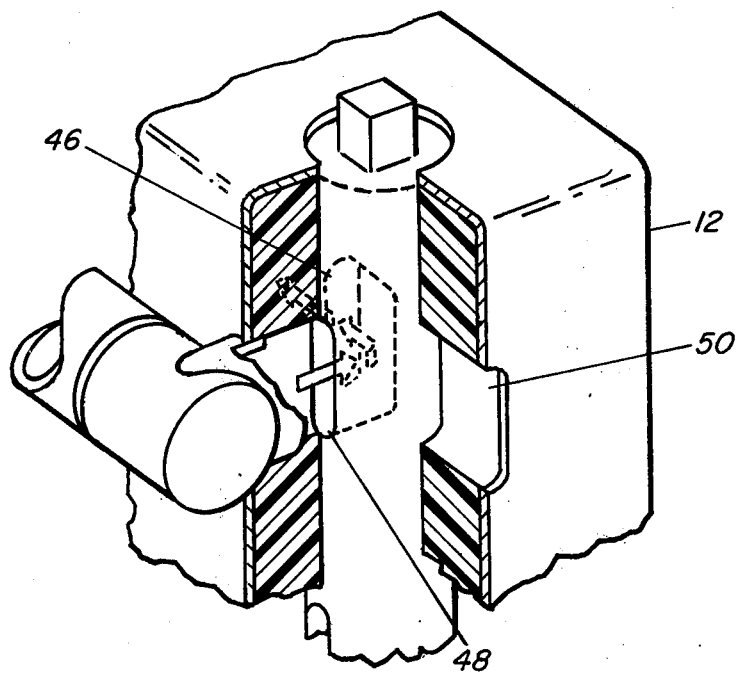
FIG. 4 is an enlarged sectional view of the arming device as shown in FIGS. 1 and 2 where the electrolyte is flowing into the battery.

The tubing 26 is connected to a safety valve 44 designed as a two way valve (see FIG. 3). In the safe condition the safety valve 44 is in the position shown in FIG. 1 so that when the diaphragm 32 is ruptured, the electrolyte 36 is caused to flow through channel 46 and 48 of valve 44 into conduit 50 and then outside of the battery. In the armed position shown in FIG. 4 the valve 44 causes the electrolyte 36 to flow through channel 46 and 48 via conduit 50 and the manifold 40 into the battery cells. The safety valve 44 acts as a secondary barrier, the diaphragms 30 and 32 being the primary barrier to prevent unwanted release of electrolyte 36 to the cell plates 38. These barriers not only contain the electrolyte 36 and protect the cell plates 38 from chemical action but also seal and thereby prevent the deterioration of the electrolyte 36 during long periods of storage. The tubing 26 contains blow-out plugs 28 consisting of copper discs soldered in place at three locations within the reservoir tubing 26. Preferably, the plugs 28 are copper discs inserted and soldered into fittings in the copper tubing 26. The function of the blow-out plugs 28 is to provide an escape for the electrolyte 36 when excessive heat conditions are reached, viz. sufficient to melt the low temperature solder holding the copper plugs in tubing 26. A gas generator 52 containing an electrically initiated pyrotechnics charge (not shown) is attached to the tubing 26 adjacent to the diaphragm 30.

The battery of the present invention is designed for use in an electrically detonated munition and is mounted therein in accordance with the input 20 and output 22 connectors. In operation the safety valve 44 is moved to the armed position and the battery is activated by applying an electrical signal through the connector 20 to the bridge of the gas generator 52 to initiate the pyrotechnic charge therein. The burning of the pyrotechnic charge in the gas generator 52 produces a pressure sufficient to rupture the diaphragms 30 and 32 and propel the electrolyte 36 into the battery cells 38. Thus the electrolyte 36 is thrown directly and forcefully in contact with all of the cell plates 38 thereby instantaneously activating the battery 10 and enabling the detonation of the munition. Each cell of the cell plates 38 fills to its capacity, the excess electrolyte 36 flows back to the electrolyte manifold 40 down into the sump 54 where it is absorbed by a fiberfill material. The activation process is thereby completed with an electrical output at connector 22.

In a crash situation when the valve 44 is in the normal safe position the tubing 26 will be either punctured or squeezed outside of the casing 12. The safety valve 44 being the hard element would remain intact, causing the venting of the electrolyte 36 outside of the battery at the point of rupture. In case the tubing 26 is squeezed without rupture it would cause the diaphragm 30 to rupture and the safety valve 44 would direct the electrolyte 36 out of the battery. In an environment of extreme heat the temperature of the electrolyte 36 would rise, causing the pressure in the tubing 26 to rise and the diaphragm 30 to rupture. The electrolyte 36 would then vent to the outside through the safety valve 44. The blow-out plugs 28 provide additional protection in that the solder holding the plugs 28 in place would melt on exposure to elevated temperatures causing the plugs 28 to separate from the tubing 26 and allowing the electrolyte 38 to vent out of the battery.

I wish it to be understood that I do not desire to be limited to the exact details of construction shown as described, for obvious modifications will occur to persons skilled in the art.

I claim:

1. A delay action battery comprising:

a casing;

a plurality of cell plates mounted in said casing;

a reservoir for electrolyte mounted externally to said casing;

a conduit communicating with said reservoir and said casing containing said cell plates;

a rupturable partition means for retaining said electrolyte in said reservoir isolated from said cell plates; and means for pressurizing said electrolyte to rupture said partition means and cause said electrolyte to enter said casing and activate said cell plates, wherein said reservoir being a tubular container having said rupturable partition means positioned at one end, a closure means at the other end and an explosive charge for rupturing said closure means and pressurizing said electrolyte, and wherein said tubular container is provided with at least one blow out plug adapted to be removed on exposure at elevated temperatures.

* * * * *